United States Patent
Burger et al.

(10) Patent No.: US 8,296,840 B2
(45) Date of Patent: Oct. 23, 2012

(54) PROVIDING PERMISSION TO PERFORM ACTION ON AN ELECTRONIC TICKET

(75) Inventors: Tomas Burger, Wiesloch (DE); Michael Halfmann, Heidelberg (DE)

(73) Assignee: SAP AG, Walldorf (DE)

( * ) Notice: Subject to any disclaimer, the term of this patent is extended or adjusted under 35 U.S.C. 154(b) by 977 days.

(21) Appl. No.: 12/339,089

(22) Filed: Dec. 19, 2008

(65) Prior Publication Data
US 2010/0162389 A1   Jun. 24, 2010

(51) Int. Cl.
*G06F 21/00* (2006.01)

(52) U.S. Cl. .................. 726/16; 726/6; 726/21; 726/28; 705/51

(58) Field of Classification Search .......................... None
See application file for complete search history.

(56) References Cited

U.S. PATENT DOCUMENTS

| | | | |
|---|---|---|---|
| 7,836,483 B2* | 11/2010 | Kerschbaum et al. | 726/1 |
| 8,010,456 B2* | 8/2011 | Bantwala et al. | 705/51 |
| 8,024,794 B1* | 9/2011 | Feldman et al. | 726/21 |
| 8,132,231 B2* | 3/2012 | Amies et al. | 726/2 |
| 2002/0026592 A1* | 2/2002 | Gavrila et al. | 713/201 |
| 2002/0178119 A1* | 11/2002 | Griffin et al. | 705/54 |
| 2008/0016580 A1* | 1/2008 | Dixit et al. | 726/27 |
| 2008/0072316 A1* | 3/2008 | Chang et al. | 726/21 |
| 2008/0244736 A1* | 10/2008 | Lampson et al. | 726/21 |
| 2010/0011361 A1* | 1/2010 | Millmore et al. | 718/100 |

OTHER PUBLICATIONS

R. K. Thomas and R. S. Sandhu: Task-based Authorization Controls (TBAC): A Family of Models for Active and Enterprise-oriented Authorization Management; Proceedings of the IFIP WG11.3 Workshop on Database Security: Aug. 11-13, 1997; Chapman & Hall: Lake Tahoe, California.

Cui-Xiao Zhang, Ying-Xin Hu, Guo-Bing Zhang; Task-Role Based Dual System Access Control Model; International Journal of Computer Science and Network Security; Jul. 2006; vol. 6 No. 7B; Shijiazhuang 050043. P.R. China.

* cited by examiner

*Primary Examiner* — Nathan Flynn
*Assistant Examiner* — Michael R Vaughan

(57) ABSTRACT

Described are methods and systems related to providing permission to a user to perform an action on a workflow driven ticket. The ticket is accessed to determine an action type to be performed on the ticket and a correlated object associated therewith. A role based permission tuple is determined based upon a role of the user. A ticket based permission tuple is determined by generating a universal permission tuple based upon the action type and generating a dependency map based upon the correlated object. The dependency map is mapped to the universal permission tuple to construct the ticket based permission tuple. The role based permission tuple is supplemented with the ticket based permission tuple, to provide the required permission to execute the action. Upon an execution of the action, the permission is partially revoked, by removing the ticket based permission tuple.

20 Claims, 6 Drawing Sheets

PROVIDING PERMISSION TO PERFORM ACTION ON AN ELECTRONIC TICKET

FIELD OF THE INVENTION

Embodiments of the invention generally relate to the field of workflow management, and more particularly they relate to methods and systems to provide permission to perform an action on a workflow driven ticket.

BACKGROUND OF THE INVENTION

Workflow management generally relates to managing the execution of a series of processes designed to accomplish some work. Processes in a workflow are made up of a sequence of tasks that may depend on one another and the execution of the tasks may need to take these dependencies into account in order to accomplish the desired work. In one sense, workflows are abstract representations of patterns of activities executed according to a business context determined by, among other things, the types of resources involved, the roles of the individuals asked to execute the tasks and the types of tasks involved.

In an enterprise context, workflow management is used to accomplish a wide variety of business activities such as approving purchases, hiring, sales, marketing and so on. Such activities will have a security component at least because it may involve accessing sensitive information or restrictions on appropriate permissions needed to take certain actions. Enterprise access control applications typically manage permissions and access based on the statically pre-determined role of a user. However, in a dynamic workflow situation, certain tasks or activities may be delegated or otherwise received by individuals who may not have all the access or authority needed to accomplish the tasks they have been assigned based solely on their static role definition. Thus, the task may be left incomplete mainly because a user is allowed to access the task, but may not be allowed to work on the task. In other words, the user may not have all the permissions needed to perform the necessary tasks to complete the activity that is in their workflow. Therefore, a method and system is required for providing such permission to perform action necessary to complete the business process.

SUMMARY OF THE INVENTION

Described are methods and systems related to providing permission to a user to perform an action on a workflow driven ticket. To perform an action on the workflow driven ticket, one or more of permissions may be required by the user. In one aspect, a role definition of the user and a role assignment of the user may be used to determine role based permissions for the user. The permission that is provided based upon the role of the user may be described in the form of a role based permission tuple that lists an object and the action that a user with the appropriate permissions can perform on that object.

In one embodiment, additional ticket based permissions may be provided temporarily and specified as a set of objects and corresponding operations that have to be performed that are specific to the ticket. In another embodiment, any ticket based permission could supplement any permission that the user may already have (e.g., role based permissions). The ticket itself could comprise information sufficient enough to enable such access. For instance, in one aspect, to provide the additional permissions, the ticket is parsed to access an action type to be performed on the ticket and a correlated object associated with the action to be performed. Based on the action type, a universal permission tuple is determined. In one embodiment, the universal permission tuple includes one or more object types and the corresponding operations allowed to be performed on the object types associated with the ticket. Based upon the correlated object associated with the ticket, a dependency map is generated. The dependency map identifies one or more auxiliary objects related to the correlated object. The dependency map and the universal permission tuple are mapped to construct a ticket based permission tuple. The ticket based permission tuple is a particular permission tuple constructed based upon an instance of an object type and a corresponding operation to be performed on the object type, that is particular to the ticket. The ticket based permission tuple supplements the role based permission tuple to provide complete permission that may be needed to perform the action on the ticket.

In yet another aspect, dependency maps are generated by determining auxiliary objects based on identifying objects hierarchically related to the correlated object. In one embodiment, at least one target auxiliary object type is identified along with a direction in which to traverse a hierarchy of which the correlated object is a part. The auxiliary object can be identified by traversing the hierarchy until the object of target type is encountered and all objects below the target object in the hierarchy are designated as auxiliary objects of the correlated object for generating the dependency map.

In an embodiment, the ticket based permission tuple is removed based upon the completion of the action on the ticket. The removal of the ticket based permission tuple would revoke the complete permission provided on the ticket. On removal of the ticket based permission tuple, the user will no longer have permission to perform the necessary action on the ticket. By restricting the permission, the action to be performed on the workflow ticket is restricted to the intended user at the intended time. The ticket does not accept any modifications to be performed once the partial permission is revoked. Also, the types of operations that have to be performed on the ticket are monitored.

In an embodiment, an already existing permission is supplemented with the additional permission (e.g., ticket based permission tuple). This additional permission is independent from currently available permissions. Thus the application programming interface (API) layer does not require any modification with respect to permission logic that is currently available. The additional permission is only being inserted to the existing permission logic, to generate the permissions needed for executing an action on the ticket.

These and other benefits and features of embodiments of the invention will be apparent upon consideration of the following description of embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with their advantages, may be best understood from the following detailed description taken in conjunction with the accompanying drawings. The invention is illustrated by the way of example and not by the way of limitation in the figures of the accompanying drawings. It should be noted that references to "an" or "one" embodiment in this disclosure are not necessarily to the same embodiment, and such references mean at least one.

DETAILED DESCRIPTION

A workflow is a process that is made up of a sequence of processes or tasks which may be dependent on each other. Tasks are specific pieces of work that may need to be carried out to perform an action. According to one embodiment, a workflow driven ticket is a collection of information, received via workflow for instance, requesting that the recipient take a specific action with respect to the content of the ticket. The workflow ticket is a specific instance of a workflow task that is instantiated at runtime and is sometimes also referred to as a workflow item. The information in the ticket may include details about the type of action to be completed, one or more objects that are involved in the action, operations that have to be performed on the objects and the like. In one embodiment, an object associated with a ticket is a collection of any type of data including, but not limited to, text documents such as forms, database tables, reports, analytics, graphics, images, business objects, hyperlinks and so on. Thus, the objects could be some information needed to perform the action. The action itself need not be directly on the object itself. So the action could include but is not limited to, approving, reviewing, editing, and commenting on the object itself. However, the action itself could be some operation that needs to be performed based on the information provided in the object. Each object may have metadata associated with it that describe its attributes, characteristics, components, properties, relationships and any other data that describe the object.

A user is notified of a ticket via workflow notifications in the form of emails, additions to their universal task list and other messages that could alert the user to the presence of a new ticket that needs their attention. However, users receiving these tickets need permission to take the actions described in the ticket.

Figure 1A:
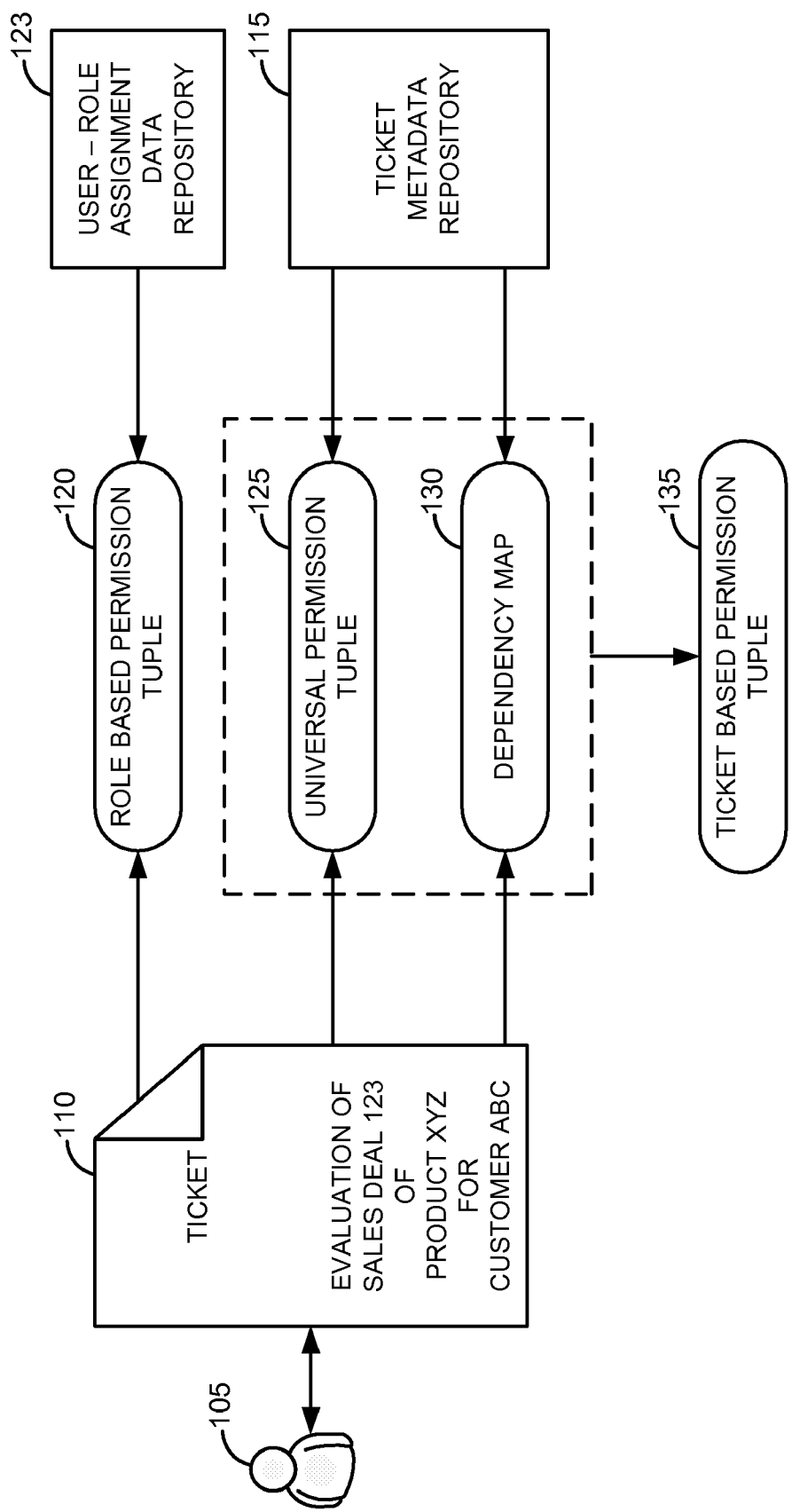
FIG. 1A illustrates an exemplary process for providing permission to a user to perform an action on a workflow driven ticket, according to an embodiment of the invention.

FIG. 1A illustrates an exemplary process for providing permission to a user to perform an action on a workflow driven ticket, according to an embodiment of the invention. Ticket 110 includes description of an action to be executed on ticket 110, and a correlated object associated with ticket 110. The correlated object may include the object on which the action needs to be performed. For instance, the action to be performed on ticket 110 may be evaluation of a sales deal thus the action type could be specified as "EVALUATION" and the correlated object may be a document titled "SALES DEAL 123". In order for the user 105 who receives the ticket 110 in their workflow to do what they have been requested to do, they may need several types of permissions. The permission may be to look at some documents or data, it may be to modify or create other documents and so on. Some such permission may be available to the users 105 based solely on their role but other permissions may need to be provided on an ad hoc basis. In an embodiment, ticket 110 may be residing in a folder that is accessed by the user 105 or it may be residing in an inbox of user 105 or in a universal work list of the user 105, or as a notification, or may appear in a task list of user 105.

In one embodiment, a user-role data repository 123 may include information about the users 105 allowed to work on various ticket types such as his or her role, assignment and the role definition. Based upon the role definition and role assignment of the user 105 from user-role data repository 123, role based permission tuple 120 is determined. Role based permission tuple 120 is just one exemplary method of specifying permissions needed to complete the action specified in the ticket 110. The role based permission tuple 120 includes permissions that are available to the user 105 based on their role alone. The role based permission tuple 120 may be in the form of a permission pair, including an object and an operation that the holder of the permission is allowed to perform on the object.

In an embodiment, role based permission tuple 120 which is provided based upon the role of the user 105 may not be sufficient to perform the specified action on ticket 110. An additional set of permissions may be necessary to complete the action. To determine this additional set of permissions, ticket 110 is parsed to access the action type and the correlated object associated with ticket 110. Based upon the action type, required metadata is retrieved from ticket metadata repository 115, to determine a generalized set of permissions referred to herein as universal permission tuple 125 that may be needed by a user 105 to perform the specified action on the ticket 110. Universal permission tuple 125 includes tuples of object types and corresponding operations to be performed on the object types. The object types define the type of objects (e.g., documents, data, and images) that a user 105 may need to access, alter, create and so on, in to order complete the action associated with the ticket 110. The corresponding operations define what the users 105 are allowed to do with the object types that are associated with ticket 110. For example, the object types that are associated with ticket 110 may include "EVALUATION", "SALES DEAL", "CUSTOMER", "PRODUCT", "BALANCE SHEET", "BILL OF MATERIALS", "PURCHASE ORDER", "INVOICE". The corresponding operations for the object types may include "CREATE", "RETRIEVE", "MODIFY", "ASSESS", "TALLY", "APPROVE", "ORDER" and the like.

The ticket 110 in a workflow typically includes a correlated object pertaining to an action associated with the ticket (e.g., ticket 110). However, to perform the action specified on the ticket 110 the user 105 may be required to access or otherwise interact with objects other than the correlated object. In one embodiment, these other objects can be identified based on their relationships or dependencies with the correlated object of the ticket 110. Such auxiliary objects may be objects that exist around the correlated object associated with ticket 110. The auxiliary objects that are present around the correlated object may be determined based upon a relationship of the correlated object. For instance, depending upon where a correlated object exists in a hierarchical chain.

The collection of auxiliary objects can be structured as a dependency map 130 identifying one or more auxiliary objects that are related to the correlated object associated with ticket 110, and the corresponding relationships. For example, the correlated object of ticket 110 is "SALES DEAL 123".

The metadata about "SALES DEAL 123" may note that this particular sales deal pertains to "PRODUCT XYZ" and "CUSTOMER ABC." Thus, the auxiliary objects "PRODUCT XYZ" and "CUSTOMER ABC" can be included in a dependency map 130 for the ticket 110. Typically, auxiliary objects are specific to the correlated object of a ticket (e.g., 110).

The metadata needed to identify these auxiliary objects can be retrieved from ticket metadata repository 115. Some of the data needed to determine the dependency map 130 could also be included in the ticket 110 itself. In one embodiment, starting with the object referred to by the workflow driven ticket 110, the object hierarchy is traversed until a target object is found. In one embodiment, the target object is specified in the metadata but preferably, the metadata does not refer to specific instances of target objects since these are not known at the time the metadata is built. Therefore it refers to a type of target object. In the sales deal evaluation for "SALES DEAL 123", the metadata could define that permissions should be granted on all products within the same organization unit as the sales deal is defined for. So the object type of the target would be "ORGUNIT", a hierarchy traversing mode may be "upwards." The dependency map 130 determination process will now traverse the hierarchy upwards starting with the "SALES DEAL 123" looking for an object type "ORGUNIT." Once an object of type "ORGUNIT" is encountered the process will traverse downwards in order to discover all child objects of that organizational unit and for each child of type "PRODUCT" the user 105 will be granted "DISPLAY" permission based on the universal permission tuple 125 "PRODUCT/DISPLAY".

Universal permission tuple 125 and dependency map 130 are mapped to construct ticket based permission tuple 135 that is particular to the ticket 110 in question. Ticket based permission tuple 135 is a particular permission tuple that is constructed specifically for ticket 110, and in an embodiment, has a life that is only as long as the ticket 110. This particular permission tuple defines a particular instance of an object and a corresponding operation to be performed on the ticket 110. The particular instance of the object and the corresponding operation is determined based upon mapping information about the correlated object, the auxiliary objects and the universal permission tuples 125 by using the object types as the key. For instance, the instance of the object type may be the correlated object type that is defined in ticket 110 and the corresponding operation may be the operation that is defined in the universal permission tuple 125 for that object type. For example, the instance of the object type may be "SALES DEAL 123" and the operation to be performed may be "RETRIEVE".

The constructed ticket based permission tuple 135 provides additional permissions based upon the action types and the correlated objects of ticket 110, that was not provided by role based permission tuple 120. Ticket based permission tuple 135 supplements the role based permission tuple 120, to provide the complete permission needed to execute the action on ticket 110. In an embodiment, ticket based permission tuple 135 is temporary and is removed based upon the completion of the action on ticket 110. The removal of ticket based permission tuple 135 would revoke some of the permissions provided but the role based permission would remain.

Figure 1B:
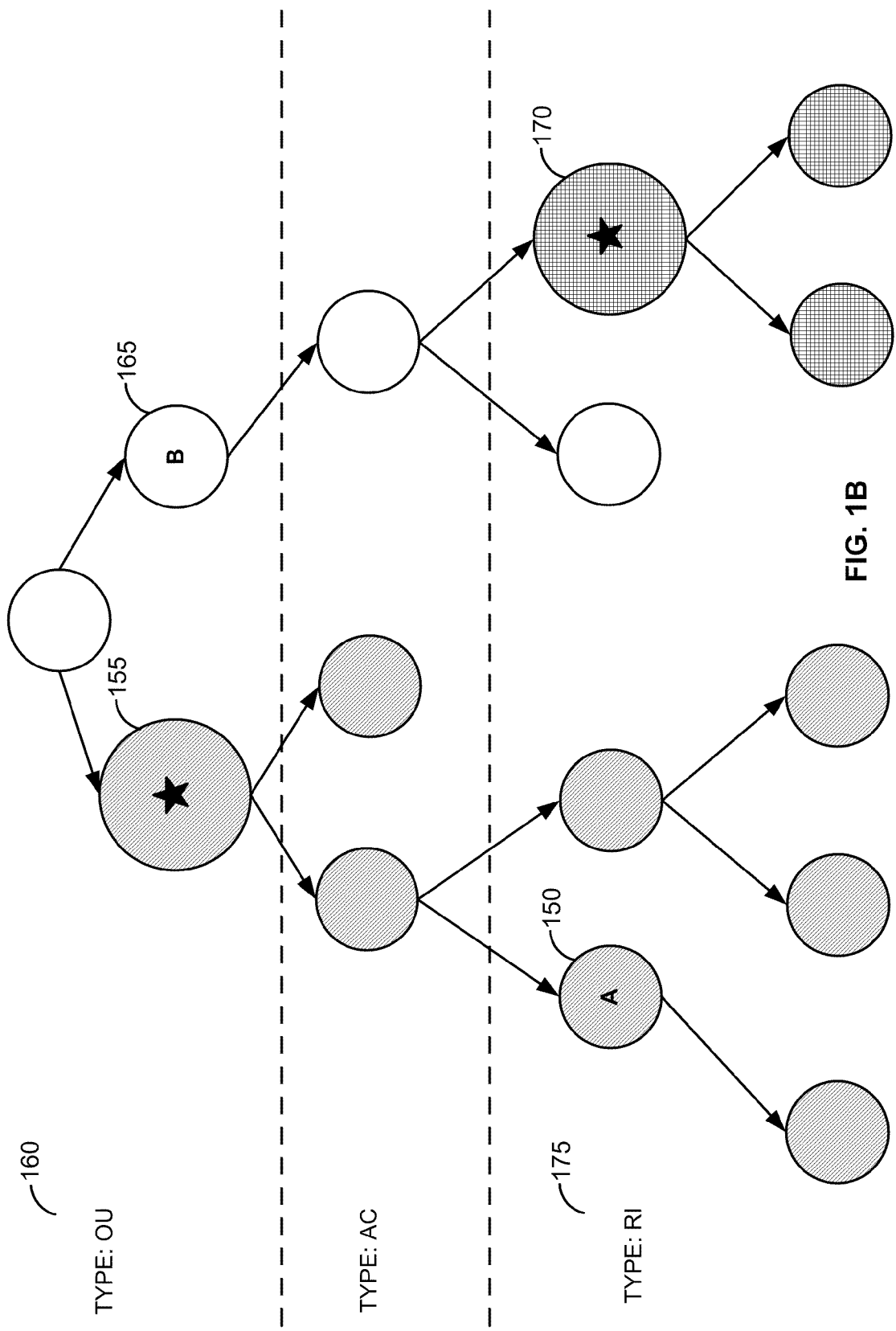
FIG. 1B illustrates an exemplary method of traversing a hierarchy for determining auxiliary objects associated with the correlated objects of a ticket in order to create a dependency map.

FIG. 1B illustrates an exemplary method of traversing a hierarchy for determining auxiliary objects associated with the correlated objects of a ticket in order to create a dependency map. For instance, if object A at 150 is identified as the correlated object, the related metadata will identify one target auxiliary target object type (e.g., type 160) and direction by which to navigate the hierarchy in order to discover the target object. Based on this, the process navigates from object A at 150 up the hierarchy till the target object 155 is encountered. After encountering the target object, all objects below the target object in the hierarchy are identified to create the dependency map. Similarly, if object B at 165 is the correlated object and an object of type 175 is designated as the target object with a direction of hierarchy traversal to be "DOWN" then the process will identify the target object 170. After identifying the target object 170, then all objects below it in the hierarchy are added to create a dependency map for ticket with object 165 as the correlated object.

Figure 2A:
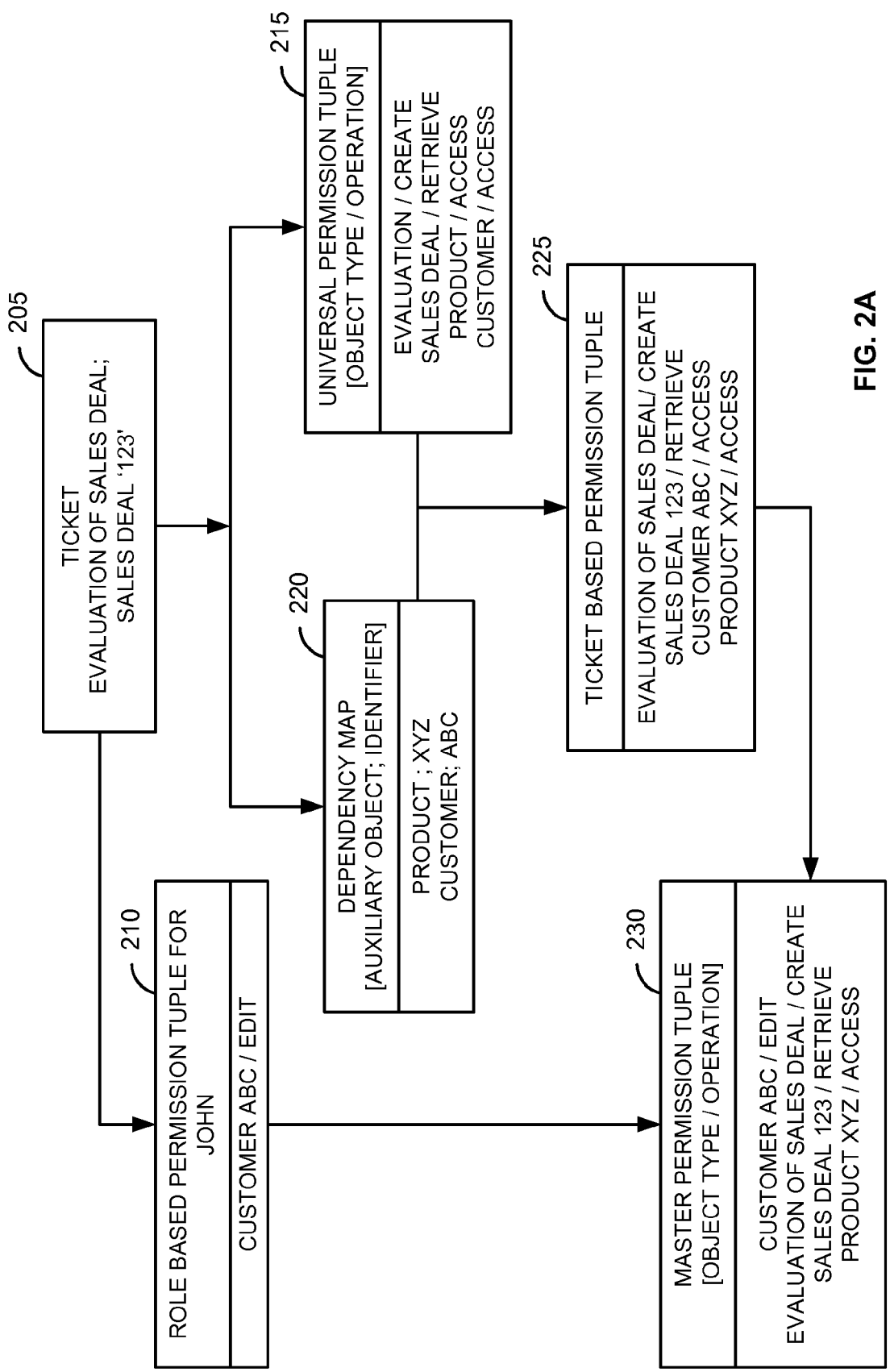
FIGS. 2A-2B are block diagrams displaying the contents of exemplary permission tuples, for providing permission to a user to perform an action on a workflow driven ticket, according to an embodiment of the invention.
Figure 2B:
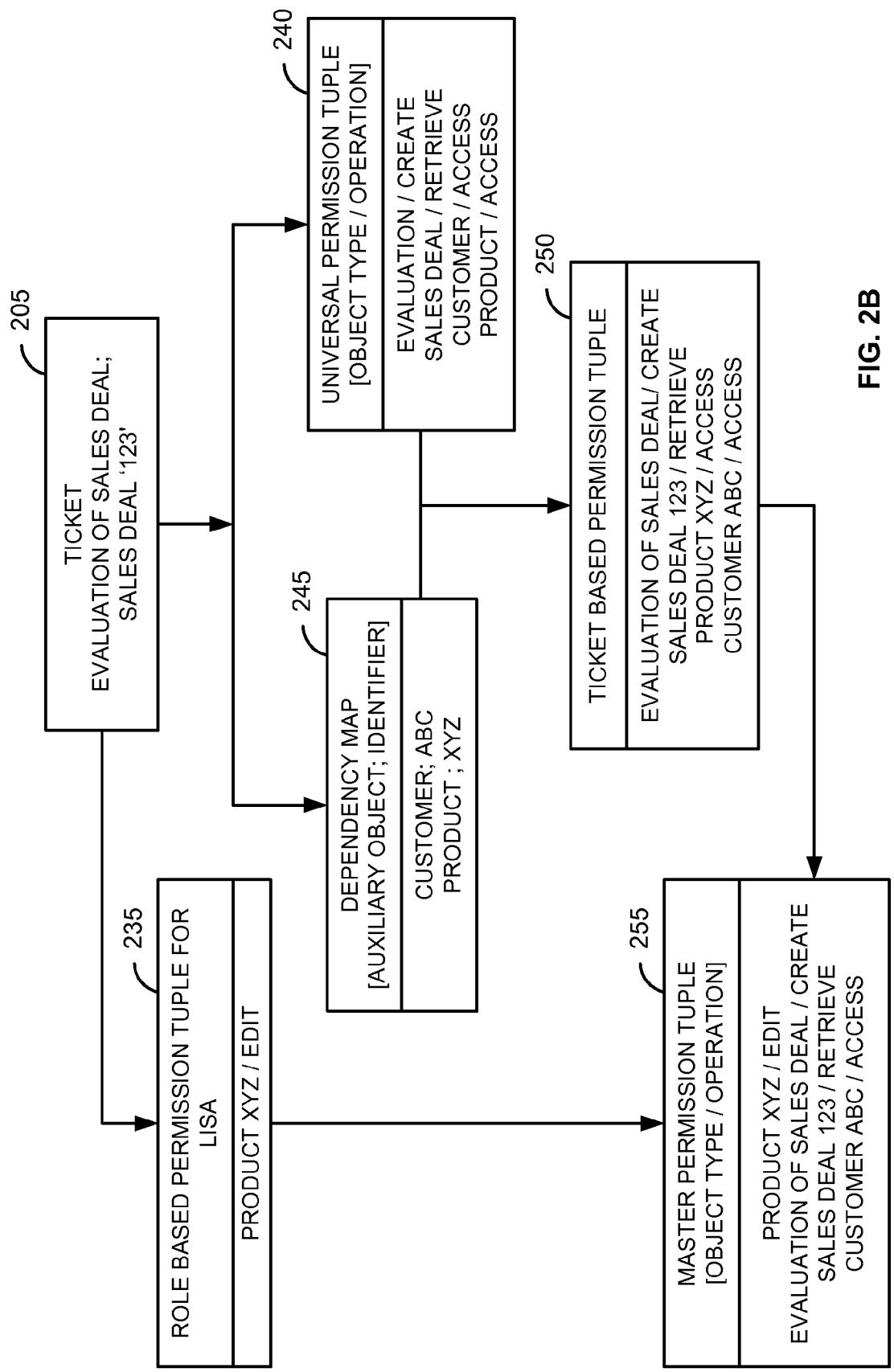

FIGS. 2A-2B are exemplary diagrams displaying the contents of tuples, for providing permission to a user to perform an action on a workflow driven ticket, according to an embodiment of the invention. Ticket 205 includes an action to be executed on the ticket 205, and a correlated object associated with the ticket 205. For instance, ticket 205 includes the action "EVALUATION OF SALES DEAL" to be performed for "SALES DEAL 123", where the "SALES DEAL 123" is the correlated object associated with ticket 205.

Referring first to FIG. 2A, based upon a role definition and a role assignment defined for a role of a user, a role based permission tuple 210 is determined. Role based permission tuple 210 includes an object and a corresponding operation to be performed on the object, that the user is allowed to perform. For instance, a role definition for a first user "JOHN" may be a "CUSTOMER CARE REPRESENTATIVE" and the role assignment may be "CUSTOMER ABC". The role based permission tuple 210 for ticket 205, for John includes object "CUSTOMER ABC" and corresponding operation "EDIT". The role based permission tuple 210 for John includes the object and the corresponding operation that John is allowed to perform, and defines permission based upon John's role.

In an embodiment, these permissions may not be sufficient to complete the execution of the ticket 205. Some additional permission may be necessary for performing the action on the ticket 205. Here, John has permission to edit the customer records of "CUSTOMER ABC", but this permission does not allow John to evaluate a "SALES DEAL 123" that may be defined for a particular product of "CUSTOMER ABC". To provide the additional permission, the ticket 205 is parsed to access the action type to be performed on the ticket 205 and a correlated object associated with the ticket 205. Based upon the action type of the ticket 205, universal permission tuple 215 is determined. Universal permission tuple 215 includes the object types and the corresponding operations to be performed on the object types associated with the ticket 205. For instance, universal permission tuple 215 includes object type "EVALUATION" and corresponding operation "CREATE", object type "SALES DEAL" and corresponding operation "RETRIEVE", object type "PRODUCT" and corresponding operation "ACCESS", and object type "CUSTOMER" and corresponding operation "ACCESS". This list preferably comprises all the permissions needed for John to perform the action on ticket 205. However, it is possible that some of the permissions needed to accomplish the operation could also be defined based on the role of the person. For instance, user John who is a customer care representative for customer ABC at 210 has a role based permission to "EDIT" customer records for customer ABC, which is a higher permission than the permission "ACCESS" required to perform the action on the ticket 205. In this case, the role based permission supersedes the ticket based permission regarding the customer record for customer ABC.

However, not all the necessary permissions can be obtained based on user's role. In that event, one has to rely on the temporary access provided by the ticket based permission tuple 225. The ticket based permission tuple 225 is created by particularizing the universal permission tuple 215 to the ticket 205 based upon its correlated object. Dependency map 220 identifies one or more auxiliary objects related to the correlated object, and the corresponding identifiers. For instance, dependency map 220 identifies the auxiliary object "CUSTOMER ABC" and auxiliary object "PRODUCT XYZ" that are related to "SALES DEAL 123".

Dependency map 220 and universal permission tuple 215 are mapped to construct ticket based permission tuple 225 that particularizes the universal permission tuple 215 to the particular ticket 205. It is this strong association of the ticket based permission tuple 225 to the ticket 205 and the action associated with the ticket 205 that allows the system to provide the needed permissions without having a large overhead for maintaining the lifecycle of these permissions. The temporary permissions simply expire when the ticket is cleaned-up after the action on the ticket 205 is completed. Ticket based permission tuple 225 is a particular permission tuple constructed based upon an instance of an object type and a corresponding operation to be performed on the object type, that is particular to ticket 205. For instance, ticket based permission tuple 225 includes an instance of a new object type "EVALUATION OF SALES DEAL" and corresponding operation "CREATE", the instance of the object type "SALES DEAL 123", and corresponding operation "RETRIEVE", the instance of the object type "PRODUCT XYZ", and corresponding operation "ACCESS" and the instance of the object type "CUSTOMER ABC", and corresponding operation "ACCESS".

Ticket based permission tuple 225 is supplemented to role based permission tuple 210 to construct master permission tuple 230, to provide complete permission to perform the action on ticket 205. Master permission tuple 230 now includes object type "CUSTOMER ABC" and corresponding operation "EDIT", object type "EVALUATE SALES DEAL" and corresponding operation "CREATE", object type "SALES DEAL 123" and corresponding operation "RETRIEVE", and object type "PRODUCT XYZ" and corresponding operation "ACCESS". Each object type and corresponding operation in master permission tuple 230 is an instance of the object type and corresponding operation that is particular to ticket 205. However, as noted above, where role based permissions provide permissions at levels at or above what is required for the action, the role based permissions preferably supersede the ticket based permissions. Ticket based permission tuple 225 may be removed from master permission tuple 230, based upon the completion of the action on ticket 205.

FIG. 2B illustrates another example. A role definition for a second user "LISA" may be a "PRODUCT MANAGER" and the role assignment may be "PRODUCT XYZ". The role based permission tuple 235 for ticket 205, for Lisa includes object "PRODUCT XYZ" and corresponding operation "EDIT". The role based permission tuple 235 for Lisa includes the object and the corresponding operation that Lisa is allowed to perform, and define the permissions that are provided based upon the role of Lisa.

In an embodiment, these permissions may not be sufficient to complete the execution of the ticket 205. Some additional permission may be necessary for performing the action on the ticket 205. Here, in FIG. 2B, Lisa has permission to access "PRODUCT XYZ", but this permission does not allow Lisa to evaluate a "SALES DEAL 123" that may be defined for a particular "CUSTOMER ABC". To provide the additional permission, the ticket 205 is parsed to access the action type to be performed on the ticket 205 and a correlated object associated with the ticket 205. Based upon the action type of the ticket 205, universal permission tuple 240 is determined. Universal permission tuple 240 includes object type "EVALUATION" and corresponding operation "CREATE", object type "SALES DEAL" and corresponding operation "RETRIEVE", object type "PRODUCT" and corresponding operation "ACCESS", and object type "CUSTOMER" and corresponding operation "ACCESS". This list preferably comprises all the permissions needed for Lisa to perform the action on ticket 205. However, it is possible that some of the permissions needed to accomplish the operation could also come based on the role of the person. For instance, user Lisa who is a product manager for product XYZ at 235 has a role based permission to "EDIT" product records for product XYZ, which is a higher permission than the permission "ACCESS" required to perform the action on the ticket 205. In this case, the role based permission supersedes the ticket based permission regarding the product record for product XYZ.

However, not all the necessary permissions can be obtained based on user's role. In that event, one has to rely on the temporary access provided by the ticket based permission tuple 250. The ticket based permission tuple 250 is created by particularizing the universal permission tuple 240 to the ticket 205 based upon its correlated object. Dependency map 245 identifies one or more auxiliary objects related to the correlated object, and the corresponding identifiers. For instance, dependency map 245 identifies the auxiliary object "PRODUCT XYZ" and auxiliary object "CUSTOMER ABC" that are related to "SALES DEAL 123".

Dependency map 245 and universal permission tuple 240 are mapped to construct ticket based permission tuple 250 that particularizes the universal permission tuple 240 to the particular ticket 205. It is this strong association of the ticket based permission tuple 250 to the ticket 205 and the action associated with ticket 205 that allows the system to provide the needed permissions without having a large overhead for maintaining the lifecycle of these permissions. The temporary permissions simply expire when the ticket is cleaned-up after the action on the ticket 205 is completed. Ticket based permission tuple 250 is a particular permission tuple constructed based upon an instance of an object type and a corresponding operation to be performed on the object type, that is particular to ticket 205. For instance, ticket based permission tuple 250 includes an instance of a new object "EVALUATION OF SALES DEAL" and corresponding operation "CREATE", the instance of the object type "SALES DEAL 123", and corresponding operation "RETRIEVE", the instance of the object type "PRODUCT XYZ", and corresponding operation "ACCESS" and the instance of the object type "CUSTOMER ABC", and corresponding operation "ACCESS".

Ticket based permission tuple 250 is supplemented to role based permission tuple 235 to construct master permission tuple 255, to provide complete permission to perform the action on ticket 205. Master permission tuple 255 now includes object type "PRODUCT XYZ" and corresponding operation "EDIT", object type "EVALUATE SALES DEAL" and corresponding operation "CREATE", object type "SALES DEAL 123" and corresponding operation "RETRIEVE", and object type "CUSTOMER ABC" and corresponding operation "ACCESS". Each object type and corresponding operation in master permission tuple 255 is an instance of the object type and corresponding operation that is particular to ticket 205. However, as noted above, where role based permissions provide permissions at levels at or above what is required for the action, the role based permissions preferably supersede the ticket based permissions. Ticket based permission tuple 250 may be removed from master permission tuple 255, based upon the completion of the action on ticket 205.

Figure 3:
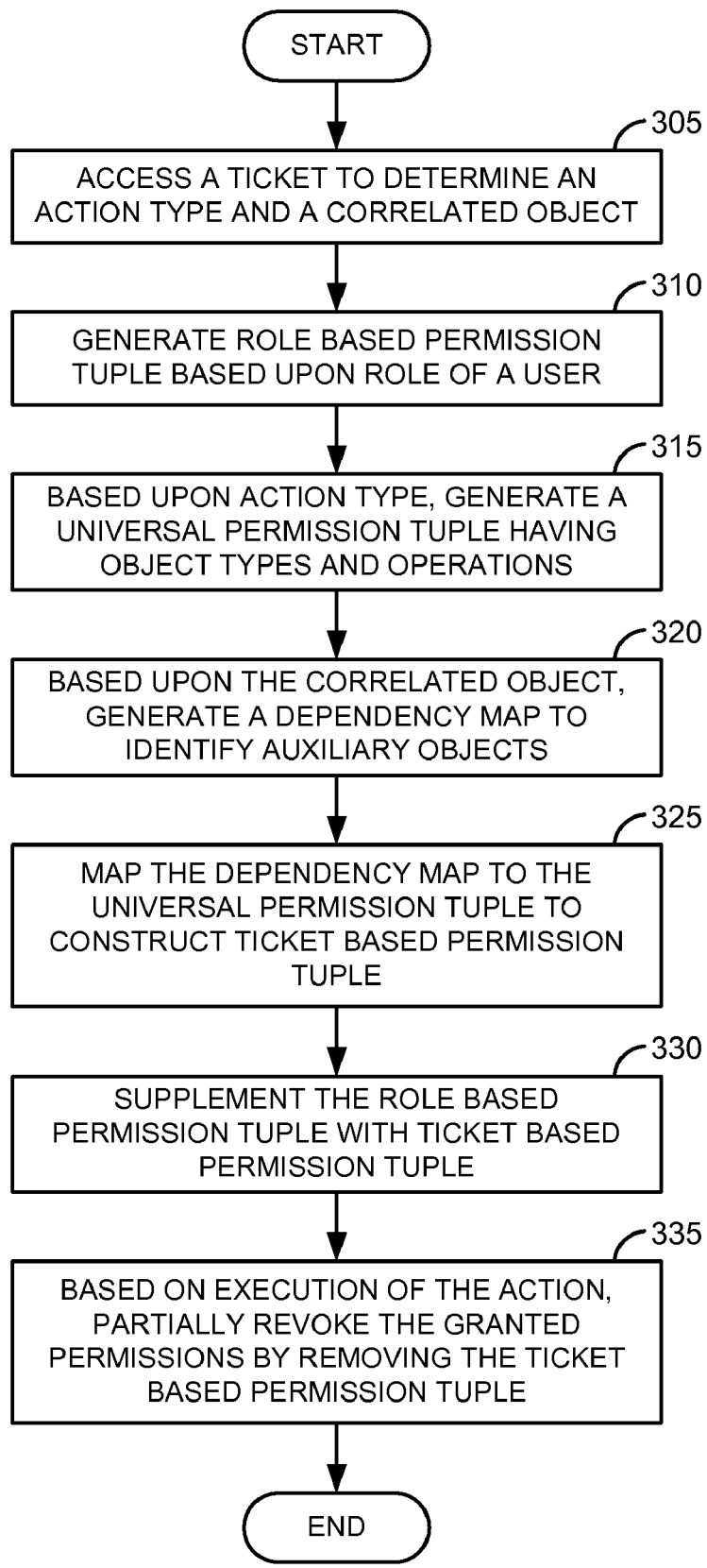
FIG. 3 is a flow diagram of an exemplary method for providing permission to a user to perform an action on a workflow driven ticket, according to another embodiment of the invention.

FIG. 3 is a flow diagram of an exemplary method for providing permission to a user to perform an action on a workflow driven ticket, according to an embodiment of the invention. In process block 305, the ticket is accessed, to determine an action type and a correlated object associated with the ticket. In an embodiment, the ticket may be residing in a folder. The user may have access to the folder to view the ticket, and the user may not have permission to perform necessary actions on the ticket. In process block 310, a role based permission tuple is generated based upon a role of the user. The role of the user describes a role definition and a role assignment of the user. A permission that is provided based upon the role of the user may be referred to as role based permission tuple. Based upon the role based permission tuple, the user may be provided with some permission to perform necessary action on the ticket.

In process block 315, based upon the action type of the ticket, a universal permission tuple is determined. The universal permission tuple includes one or more object types and corresponding operations to be performed on the object types associated with the ticket. In process block 320, based upon the correlated object associated with the ticket, a dependency map is generated. The dependency map identifies one or more auxiliary objects related to the correlated object. In process block 325, the dependency map is mapped to the universal permission tuple, to construct a ticket based permission tuple. The ticket based permission tuple is a particular permission tuple constructed based upon an instance of an object type and a corresponding operation to be performed on the object type, that is particular to the ticket. The ticket based permission tuple provides the additional permission necessary to perform the action on the ticket.

In process block 330, the ticket based permission tuple is supplemented to the role based permission tuple to provide complete permission to perform the action on the ticket. In process block 335, based upon completion of the action on the ticket, the permission is partially revoked by removing the ticket based permission tuple.

Figure 4:
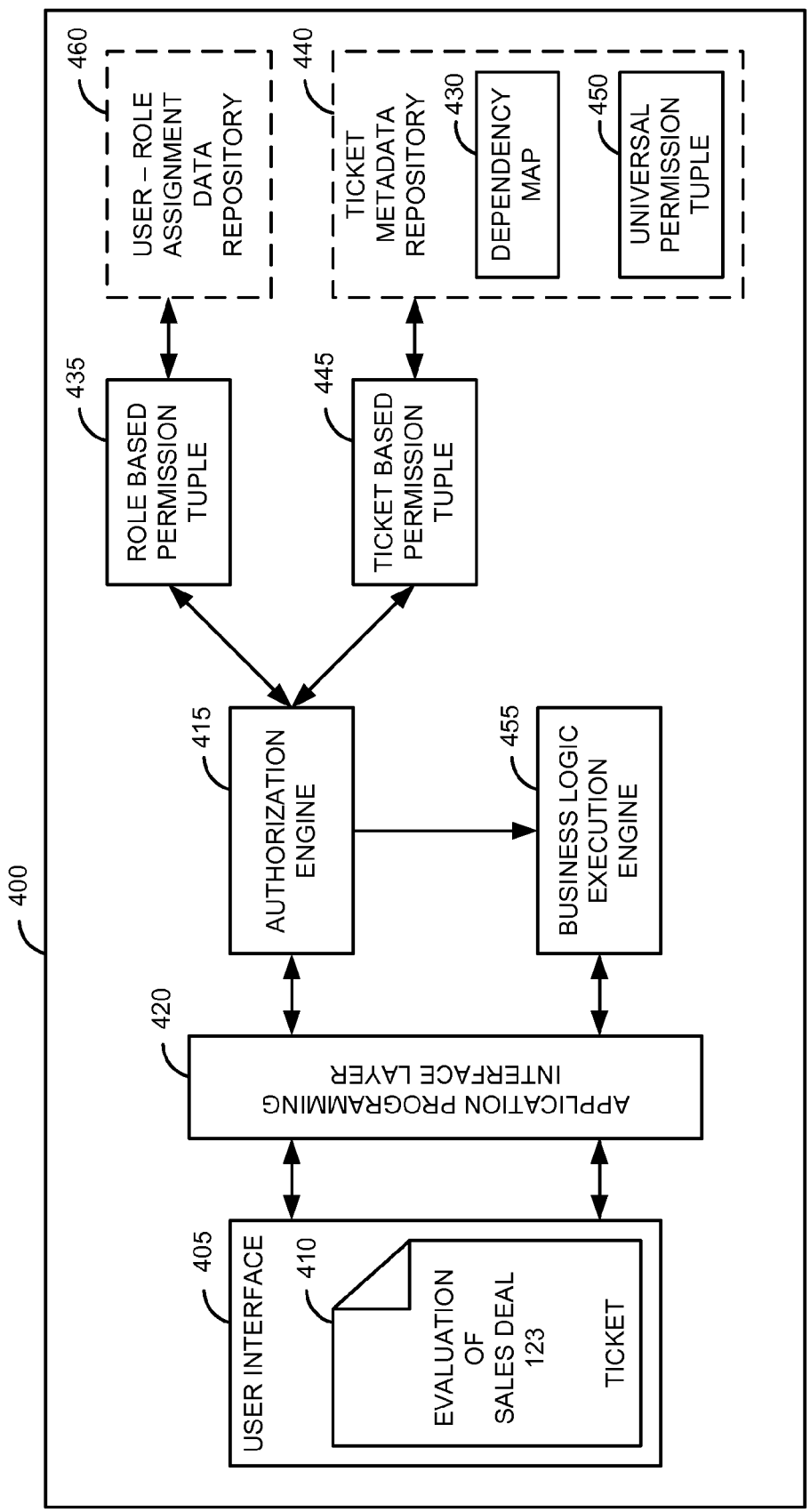
FIG. 4 is a block diagram of an exemplary system for providing permission to a user to perform an action on a workflow driven ticket, according to an embodiment of the invention.

FIG. 4 is a block diagram of an exemplary system for providing permission to a user to perform an action on a workflow driven ticket, according to an embodiment of the invention. System 400 includes system components like user interface 405, ticket 410, authorization engine 415, application programming interface (API) layer 420, ticket metadata repository 440, user-role assignment repository 460 and business logic execution engine 455. In an embodiment, user interface 405 is in communication with authorization engine 415 and business logic execution engine 455. Authorization engine 415 is in communication with application programming interface layer 420, and business logic execution engine 455. In an embodiment, application programming interface layer 420 connects user interface 405 from one or both of authorization engine 415 and business logic execution engine 455. Other interfaces connect authorization engine 415, ticket metadata repository 440, user-role assignment repository 460 and business logic execution engine 455 to each other.

System 400 provides permission to the user to perform the action on ticket 410. Ticket 410 includes an action to be executed on the ticket 410, and a correlated object associated with the ticket 410. The correlated object may include the object on which the action needs to be performed. Based upon a role of the user, authorization engine 415 determines necessary permissions to generate role based permission tuples 435 particular to the ticket 410 (e.g., based on the role of the user receiving the ticket) from the role based permission tuple 435 stored in the user-role assignment repository 460. In an embodiment, these role based permissions may not be sufficient to complete the execution of the action on the ticket 410. An additional set of permissions may be necessary to complete the action. To determine this additional set of permissions, authorization engine 415 calls API layer 420, to parse ticket 410, and access the action type and correlated object associated with ticket 410. Based upon the action type, required metadata is retrieved from ticket metadata repository 440, to determine universal permission tuple 450 that may be needed by the user to perform the specified action on ticket 410. In an embodiment, universal permission tuple 450 may be stored on ticket metadata repository 440. Based upon the correlated object pertaining to the action associated with the ticket 410, required metadata is retrieved from ticket metadata repository 440, to determine dependency map 430. Dependency map 430 identifies one or more auxiliary objects that are related to the correlated object.

Authorization engine 415 maps universal permission tuple 450 and dependency map 430 to construct ticket based permission tuple 445 based on the mapping. Ticket based permission tuple 445 is a particular permission tuple that is constructed specifically to ticket 410, and may have a life that is only as long as ticket 410. This particular permission tuple defines a particular instance of an object and a corresponding operation to be performed on the ticket 410. The constructed ticket based permission tuple 445 provides additional permissions based upon the action types and the correlated objects of ticket 410, that was not provided by role based permission tuple 435. In an embodiment, ticket based permission tuple 445 may be temporarily stored in ticket metadata repository 440. Authorization engine 415 supplements role based permission tuple 435 with ticket based permission tuple 445, to provide complete permission to execute the action on ticket 410. Once the ticket based permission tuple 445 is available along with the role based permission tuple 435, business logic execution engine 455 executes necessary action on ticket 410. In an embodiment, ticket based permission tuple 445 is temporary and is removed based upon the completion of the action on ticket 410. The removal of ticket based permission tuple 445 would revoke the some of the permissions provided but the role based permission tuple 435 would remain.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a tangible machine-readable medium for storing the machine-executable instructions. The tangible CD-ROMs, DVD ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

The invention claimed is:

1. A computer implemented method to provide permission to a user to execute an action on a workflow driven ticket, the method comprising:
    accessing the ticket received on a computer generated user interface to determine an action type to be performed on the ticket, and a correlated object associated with the ticket;
    determining a role based permission tuple based upon a role of the user;
    a processor of the computer, generating a universal permission tuple based upon the action type, the universal permission tuple including one or more object types and corresponding operations to be performed on the object types associated with the ticket;
    based upon the correlated object, generating a dependency map by identifying one or more auxiliary objects related to the correlated object;
    the processor of the computer, mapping the dependency map to the universal permission tuple to construct a ticket based permission tuple, the ticket based permission tuple comprising a particularized permission tuple including an instance of at least one of the one or more object types of the universal permission tuple and the corresponding operation;
    supplementing the role based permission tuple with the ticket based permission tuple, to provide the permission required to execute the action; and
    based upon an execution of the action of the action type associated with the ticket, partially revoking the permission by removing the ticket based permission tuple.

2. The computer implemented method of claim 1, further comprising receiving access to the ticket via a ticket folder.

3. The computer implemented method of claim 1, further comprising receiving the ticket via a universal work list.

4. The computer implemented method of claim 1, wherein the one or more auxiliary objects are determined based on determining objects having a dependency relationship to the correlated object.

5. The computer implemented method of claim 1, wherein determining the one or more auxiliary objects related to the correlated object comprises:
    receiving identification of a target auxiliary object type and a direction to traverse a hierarchy of which the correlated object is a part;
    the processor traversing the hierarchy in the received direction until an object of the target object type is encountered; and
    identifying objects below the target object in the hierarchy as auxiliary objects to generate the dependency map.

6. The computer implemented method of claim 1, wherein the role based permission tuple is determined based upon a role definition and a role assignment of the user.

7. The computer implemented method of claim 1, wherein the ticket comprises an action type identifier, and
    generating the universal permission tuple based upon the action type comprises looking up the universal permission tuple in a look up table using the action type identifier as a key.

8. The computer implemented method of claim 1, wherein supplementing the role based permission tuple with the ticket based permission tuple comprises appending the particularized permission tuple to the determined role based permission tuple.

9. The computer implemented method of claim 1, wherein supplementing the role based permission tuple with the ticket based permission tuple comprises injecting the ticket based permission tuple to an authorization engine without altering the role based permission tuple.

10. A computing system to provide permission to a user to execute an action on a workflow driven ticket received by the user on a user interface, the computing system comprising:
    a processor to read and execute instructions stored in a machine-readable media; and
    the machine-readable media storing instructions related to an authorization engine operable to:
        access the ticket received on the user interface, and determine an action type to be performed on the ticket and a correlated object associated with the ticket;
        determine a role based permission tuple based upon a role of the user;
        generate a universal permission tuple based upon the action type, the universal permission tuple including one or more object types and corresponding operations to be performed on the object types associated with the ticket;
        generate a dependency map based upon the correlated object identifying one or more auxiliary objects related to the correlated object;
        map the dependency map to the universal permission tuple and construct
        a ticket based permission tuple, the ticket based permission tuple comprising a particularized permission tuple including an instance of at least one of the one or more object types of the universal permission tuple and the corresponding operation; and
        supplement a role based permission tuple with the ticket based permission tuple and provide the permission to execute the action;
    a ticket metadata repository to store the universal permission tuples and the role based permission tuples.

11. The computing system of claim 10, further comprising a business logic execution engine in communication with the authorization engine, to execute the action based on the permissions provided by the authorization engine.

12. The computing system of claim 10, further comprising the user interface to receive a notification of the ticket.

13. The computing system of claim 10, wherein the authorization engine is further operable to remove the ticket based permission tuple upon the completion of the action.

14. The computing system of claim 10, wherein the authorization engine generates the role based permission tuple based upon a role definition and a role assignment for a user.

15. The computing system of claim 10, wherein authorization engine retrieves the universal permission tuple based upon metadata of the ticket.

16. The computing system of claim 15, wherein the metadata includes the action type identifier associated with the ticket.

17. The computing system of claim 10, wherein the authorization engine retrieves the dependency map based upon the metadata of the ticket.

18. The computing system of claim 17, wherein
the metadata includes a correlated object associated with the ticket and
the authorization engine is further operable to determine auxiliary objects related to the correlated object to generate the dependency map.

19. An article of manufacture, comprising a tangible storage medium comprising machine readable instructions which when executed by a machine cause the machine to perform a method of providing permission to a user to perform an action on a workflow driven ticket, the method comprising:
   accessing the ticket to determine an action type to be performed on the ticket and a correlated object associated with the ticket;
   determining a role based permission tuple based upon a role of the user;
   generating a universal permission tuple based upon the action type, the universal permission tuple having one or more object types and corresponding operations to be performed on the object types associated with the ticket;
   based upon the correlated object, generating a dependency map by identifying one or more auxiliary objects related to the correlated object;
   mapping the dependency map to the universal permission tuple, to construct a ticket based permission tuple, the ticket based permission tuple comprising a particularized permission tuple including an instance of at least one of the one or more object types of the universal permission tuple and the corresponding operation;
   supplementing the role based permission tuple with the ticket based permission tuple, to provide the permission required to execute the action; and
   based upon an execution of the action, partially revoking the permission by removing the ticket based permission tuple.

20. The article of manufacture of claim 19, wherein generating the dependency map by identifying one or more auxiliary objects related to the correlated object comprises:
   receiving identification of a target auxiliary object type and a direction to traverse a hierarchy of which the correlated object is a part;
   traversing the hierarchy in the specified direction until an object of the target object type is encountered; and
   identifying objects below the target object in the hierarchy as auxiliary objects to generate the dependency map.

\* \* \* \* \*